3,496,197
OXIDATION OF ALDEHYDES TO KETONES
EMPLOYING COPPER IONS AS CATALYSTS
Verlan H. Van Rheenen, Kalamazoo, Mich., assignor to
The Upjohn Company, Kalamazoo, Mich., a corporation of Delaware
No Drawing. Continuation-in-part of application Ser. No. 627,659, Apr. 3, 1967. This application Mar. 5, 1969, Ser. No. 804,701
Int. Cl. C07c *167/18, 169/34, 49/76*
U.S. Cl. 260—397.3           15 Claims

ABSTRACT OF THE DISCLOSURE

Ketones are produced by subjecting branched chain aldehydes to the action of molecular oxygen in the presence of catalytic amounts of copper ions and an organic base.

CROSS REFERENCE TO RELATED APPLICATION

This application is a continuation-in-part of application Ser. No. 627,659, filed Apr. 3, 1967.

BRIEF SUMMARY OF THE INVENTION

This invention relates to the preparation of ketones in accordance with the following equation:

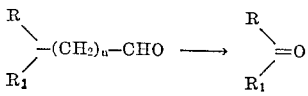

where $n$ is an integer from zero to four, inclusive, R and $R_1$ taken separately are the same or different aliphatic or aromatic radicals, and, taken together form a ring containing from four to seven atoms, and upon which additional rings can be attached or fused. The reaction is carried out by subjecting the aldehyde as here defined to the action of molecular oxygen in the presence of catalytic amounts of copper ions and an organic base.

The reaction is carried out in the presence of organic solvents. We prefer polar aprotic solvents such as dimethylformamide (DMF), hexamethylphosphoramide (HMPA), dimethylsulfoxide (DMSO), tetramethylurea and dimethylacetamide. Other organic solvents can be used, nonetheless; for example, alkanols such as methanol, ethanol or t-butanol and other oxygen containing solvents such as tetrahydrofuran, dioxane and the like; or hydrocarbon solvents such as benzene.

The reaction is carried out in the presence of a base. We prefer diazobicycloalkanes such as diazobicyclooctane (DABCO). Tertiary amines such as triethyl, tripropyl, etc., amine, N,N'-dimethylpiperizine, N-methyl pyridine, N-methyl pyrolidine, quinuclidine and the like can be used effectively.

The metal compounds which can be employed as catalyst are cupric salts. The presence of copper ion, characterizing the process of this invention, can be achieved by use of such compounds as cupric acetate, cupric sulfate, cupric chloride, cupric nitrate, cuprous acetate and cuprous sulfate. Cupric acetate is especially advantageous.

The cupric compounds are preferred to the cuprous. The latter are transformed into the former under the oxidative conditions of the reaction.

The reaction is assisted by the use of certain copper-complexing agents such as 1,10-phenanthroline and 2,2'-bipyridyl. These agents have been found to result fairly consistently in a yield gain of from 2% to 6% compared with the use of no complexing agent. The amount of copper-complexing agent preferred is approximately that which is required to combine with the copper ion present in the reaction mixture.

The reaction can be carried out at any temperature at which the reaction mixture is fluid. Temperatures of 20° C. to 65° C. are preferred, and the temperature range found to give the best results for many of the oxidations is 45–50° C.

The reaction characterizing this invention can be carried out conveniently in the substantial absence of water, but we have discovered that the presence of water in minor amounts of up to less than 10% of the reaction mixture by volume does not have an adverse effect. In the case of HMPA the effect of the presence of up to 10% water by volume is to enhance the yield of 20-keto product and to accelerate the speed of the reaction.

A list of typical starting materials is given below, together with the end-product ketones. One important class of starting materials is typified by steroid 22-aldehydes possessing the following 17-side chain and D-ring configuration:

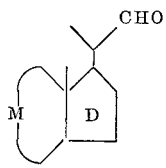

The remainder of the steroid molecule M, with reference to the above formula, can include a wide variety of nuclear substituents and combinations of unsaturated bonds. For example, the starting 22-aldehyde can possess a 6- or 7-substituent such as a α- or β-alkyl or α- or β-halogen. It can also possess oxygen substituents in the 3 and/or 11-positions such as α- or β-hydroxyl or keto groups. Moreover, substituents can be present in the 4-, 9- and 12-positions, and those substituents can be alkyl or halogen. Double bonds can be present as in the Δ⁴-3-one structure, the 3-keto-1,4-diene structure, the 3-keto-1,4,6-triene structure or the 3-keto-4,6-diene structure. There can also be double bonds present in the 9(11)-position, the 5(6)-position or the 7(8)-position.

This invention includes the discovery that the 22-aldehyde structure of the above formula is readily transformed into the 20-keto structure:

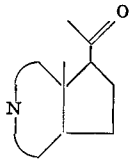

by means of a base catalyzed oxygenation reaction carried out in the presence of catalytic amounts of copper or iron compounds. The products of this invention, e.g., progesterone, are valuable intermediates in the production of a wide variety of biological active steroids such as cortisone, hydrocortisone, prednisolone, 6α-methylprednisolone and the like.

Representative starting materials for this aspect of the invention can be represented by the general formula:

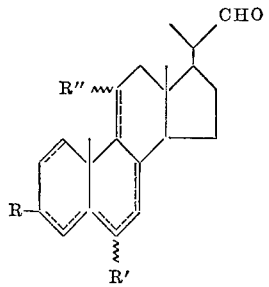

wherein R is a member of the group consisting of carbonyl, OH, O-alkyl, O-acyl and (O-alkyl)$_2$; R' is a member of the group consisting of H, CH$_3$ and F; R" is a member of H, OH, carbonyl and O-acyl, and the dotted lines represent the presence or absence of a double bond.

Representative products of this aspect of the invention have the following formula wherein the parameters have the same values as above.

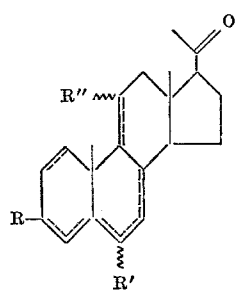

DETAILED DESCRIPTION

Typical starting materials and the product ketones are as follows:

(1) 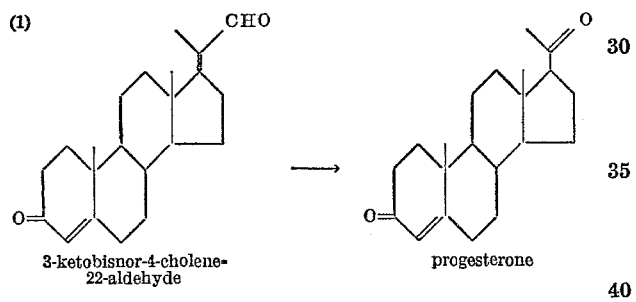
3-ketobisnor-4-cholene-22-aldehyde → progesterone (2) 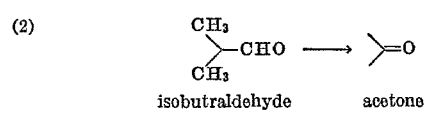
isobutraldehyde → acetone (3) 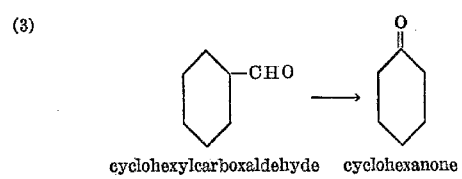
cyclohexylcarboxaldehyde → cyclohexanone (4) 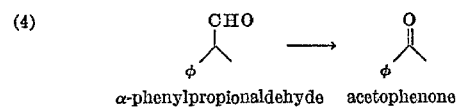
α-phenylpropionaldehyde → acetophenone (5) 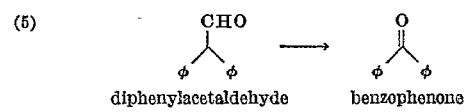
diphenylacetaldehyde → benzophenone (6) 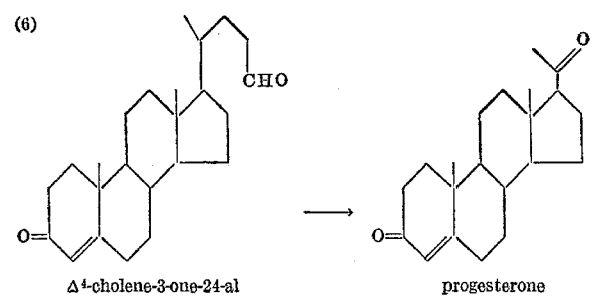
Δ$^4$-cholene-3-one-24-al → progesterone (7) 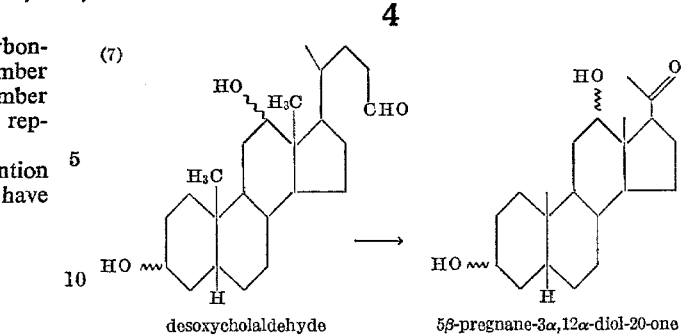
desoxycholaldehyde → 5β-pregnane-3α,12α-diol-20-one (8) 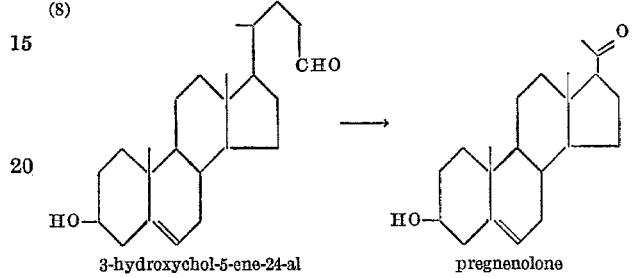
3-hydroxychol-5-ene-24-al → pregnenolone (9) 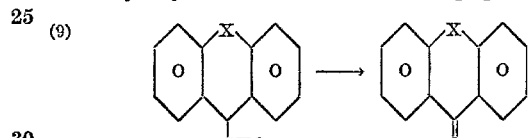

$X = \diagdown CH_2$ or $-N-R$, and $X = \diagdown S$ 11-hydroxy-3-ketobisnor-4-cholene-22-aldehyde is similarly converted to 11-hydroxyprogesterone; 3,11-diketobisnor-4-cholene-aldehyde is converted to 11-ketoprogesterone; 6α-methylbisnorcholene-22-aldehyde is converted to 6α-methylprogesterone. Also these can be accomplished by the corresponding conversions of compounds having an aromatic A-ring as 3-hydroxy-19,23,24-trisnorchol-1,3,5(10)-trien-22-al is converted to the corresponding 20-keto derivative.

The following are typical examples of the process of the invention:

EXAMPLE 1

Conversion of 3-ketobisnor-4-cholene-22-aldehyde (bisnoraldehyde) to progesterone

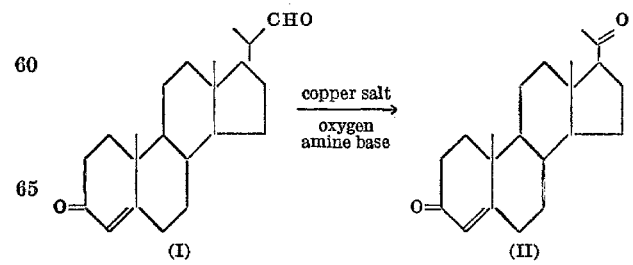

To a slurry of 25 g. of bisnoraldehyde in 75 ml. of hexamethylphosphoramide (HMPA) was added 10.0 g. of diazobicyclooctane (DABCO), 4.0 g. of cupric acetate and 1 ml. of water. This slurry was brought to 50° C. and oxygen was passed into the reactor for 5½ hours. The reaction mixture was cooled and the product was precipitated by addition of water. The solids were eluted through a small amount of silica gel with ethyl acetate and the eluate was analyzed by quantitative VPC (85.8%, 86.6% progesterone). The solvent was evaporated and the solid obtained was recrystallized from acetone giving two crops of progesterone totalling 20.42 g. (85.5% theory). M.P. =125.5–128.5° C., $[\alpha]_D=+175°$.

Instead of bisnoraldehyde in the foregoing experiment, there may be substituted 6-methyl-3-ketobisnor-4-cholenealdehyde to produce 6-methylprogesterone. 3-ketobisnor-4,7(8)-choladienealdehyde produces 7(8)-dehydroprogesterone, and 3-ketobisnor-4,6-choladienealdehyde produces 6-dehydroprogesterone.

EXAMPLE 2

Conversion of 3-ketobisnor-4-cholene-22-aldehyde (bisnoraldehyde) to progesterone Example 1 was repeated using dimethylformamide as solvent. In addition 3.3 g. of 2,2′-bipyridyl was added as a copper-complexing agent. Oxygen was passed into reactor for a period of 3¼ hours. The reaction mixture was worked up as in Example 1, giving a yield of progesterone of 86.7% having M.P.=126.5–127.5° C., $[\alpha]_D=173.9°$.

EXAMPLE 3

3-ketobisnor-4-cholen-22-al to progesterone

Air was passed through a vigorously stirred slurry of 150 g. bisnoraldehyde, 30 g. diazobicyclooctane (DABCO), 2.2 g. of cupric acetate and 1.75 g. 2,2′-bipyridyl in 300 ml. dimethylformamide (DMF) at 40° C. for 16 hours. The solvent was evaporated under vacuum and crystallization from methanol yielded 117.0 g. (81.5%) of progesterone, M.P.=127.5–129° C., $[\alpha]_D=+175.7°$.

Treatment of the mother liquors with 30 g. of sodium dichromate in 150 ml. acetic acid followed by an acid and base wash yielded an additional 12.7 g. of progesterone, M.P.=128–130° C., $[\alpha]_D=177.5°$, for an overall yield of 90.3%.

EXAMPLE 4

Conversion of isobutraldehyde to acetone

To a solution of 30.0 g. DABCO in 200 ml. t-butanol was added a complex made up of 1.1 g. cupric acetate and 0.9 g. 2,2′-bipyridyl. After addition of 50 ml. isobutraldehyde the mixture was oxygenated at 40° C. for 7½ hours. The yield of acetone was determined by quantitative VPC using methanol as internal standard to be 75%. The product acetone could be isolated by careful distillation. Its 2,4-dinitrophenyl hydrazone had a M.P. =123.1–124.8° C.

EXAMPLE 5

Preparation of cyclohexanone from cyclohexylcarboxaldehyde

To 125 ml. t-butanol was added 15 g. DABCO and a complex made up of 1.1 g. cupric acetate and 8.9 g. 2,2′-bipyridyl, and 30 g. of cyclohexylcarboxaldehyde. This mixture was oxygenated at 43° C. for 12 hours. Acetic acid was added until neutrality, the solvent was evaporated and the residue was taken up in benzene and washed with water. Evaporation of the benzene and distillation of the residue gave 16.7 g. cyclohexanone (65.8%) 2.4-dinitrophenylhydrazone, M.P.=153–156.5° C.

EXAMPLE 6

Preparation of acetophenone from α-phenylpropionaldehyde

To a copper catalyst made up of 0.6 g. of cupric acetate and 0.5 g. 2,2′-bipyridyl in 100 ml. t-butanol was added 5.0 g. DABCO and 17.2 g. α-phenylpropionaldehyde. Oxygen was introduced into the reaction at room temperature for 1½ hours. The t-butanol was evaporated, benzene was added and extracted with dilute sodium hydroxide, washed to neutrality with water, dried and evaporated to a viscous oil. Distillation of this residue at 10 mm. pressure and 68° C. gave 11.95 g. (78%) of acetophenone (2,4-dinitrophenylhydrazone, M.P.=243–244.5° C.).

EXAMPLE 7

Preparation of benzophenone from diphenylacetaldehyde

To the catalyst made up of 0.6 g. cupric acetate and 0.5 g. 2,2′-bipyridyl in 100 ml. t-butanol was added 5.0 g. DABCO and 25 g. diphenylacetaldehyde. This mixture was oxygenated for 45 minutes at room temperature. The t-butanol was evaporated, benzene added and extracted with dilute sodium hydroxide, washed with water, dried and evaporated to an oil. Crystallization from ethanol and chromatography gave 21.8 g. (94%) of benzophenone, M.P.=46.5–49° C. (2,4-dinitrophenylhydrazone, M.P.=236–237° C.).

EXAMPLE 8

Preparation of progesterone from Δ⁴-cholene-3-one-24 al

In 1 ml. DMF was placed 20 mg. Δ⁴-cholene-3-one-24 al, 210 mg. DABCO and a complex made up of 10 mg. cupric acetate and 10 mg. 2,2′-bipyridyl. This mixture was oxygenated for seven hours at 40° C. The formation of progesterone was shown by thin layer chromatography. Conversion to progesterone was ∼40% by VPC.

EXAMPLE 9

Preparation of 5β-pregnane-3α,12α-diol-20-one from desoxycholaldehyde

In 9 ml. HMPA was placed 100 mg. 2,2′-bipyridyl, 100 mg. cupric acetate, 1 g. DABCO and 1 g. desoxycholaldehyde which was oxygenated for 10 hours at 45° C. 5β-pregnane-3α,12α-diol-20-one was obtained in ∼60% yield as estimated by TLC.

EXAMPLE 10

Preparation of pregnenolone from 3-hydroxy-5-cholene-24 al 1.5 g. of 3-hydroxy-5-cholene-24 al in 9 ml. HMPA contained 1.2 g. DABCO and 220 mg. cupric acetate was oxygenated at 50° C. for 67 hours. Quantitative VPC revealed the presence of 15.2% yield of pregnenolone.

I claim:

1. In a process for the preparation of ketones by oxidative reaction in accordance with the following equation:

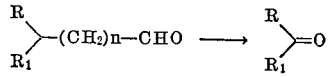

wherein $n$ is an integer from zero to four, inclusive, R and $R_1$ taken separately are the same different aliphatic or aromatic radicals, and, taken together form a ring containing from four to seven carbon atoms, and upon which additional rings can be fused, the improvement which comprises carrying out the reaction with molecular oxygen in the presence of catalytic amounts of copper ions and an organic base.

2. The process in accordance with claim 1 of producing a 20-ketosteroid compound which comprises subjecting a steroid 22-aldehyde to the action of molecular oxygen in the presence of catalytic amounts of copper ions and an organic base, and recovering the thus formed 20-ketosteroid product from the reaction mixture.

3. Process of claim 1 wherein the reaction is carried out in a polar aprotic solvent.

4. Process of claim 3 wherein the solvent is dimethylformamide.

5. Process of claim 1 wherein the reaction is carried out in a polar aprotic solvent in the presence of a member of the group consisting of 1,10-phenanthroline and 2,2′-bipyridyl.

6. Process of claim 3 wherein the base is diazobicyclooctane.

7. Process of claim 3 wherein the copper compound is cupric acetate.

8. Process of claim 3 wherein the starting material is 3-ketobisnor-4-cholene-22-aldehyde and the product is progesterone.

9. Process of claim 1 wherein the starting material is iso butraldehyde and the product is acetone.

10. Process of claim 1 wherein the starting material is cyclohexylcarboxaldehyde and the product is cyclohexanone.

11. Process of claim 1 wherein the starting material is α-phenyl-propionaldehyde and the product is acetophenone.

12. Process of claim 1 wherein the starting material is diphenylacetaldehyde and the product is benzopenone.

13. Process of claim 1 wherein the starting material is $\Delta^4$-cholene-3-one-24-al and the product is progesterone.

14. Process of claim 1 wherein the starting material is desoxycholaldehyde and the product is 5β-pregnane-3α,-12α-diol-20-one.

15. Process of claim 1 wherein the starting material is 3-hydroxy-5-cholene-24-al and the product is pregnenolone.

References Cited

UNITED STATES PATENTS

| | | | |
|---|---|---|---|
| 2,461,912 | 2/1949 | Miescher et al. | 260—397.3 |
| 3,384,668 | 5/1968 | Canter et al. | 260—593 |

LEWIS GOTTS, Primary Examiner

E. C. LOVE, Assistant Examiner

U.S. Cl. X.R.

260—276, 328, 397.4, 397.45, 586, 590, 591, 592, 593

UNITED STATES PATENT OFFICE
CERTIFICATE OF CORRECTION

Patent No. 3,496,197  Dated February 17, 1970

Inventor(s)  Verlan H. Van Rheenen

It is certified that error appears in the above-identified patent and that said Letters Patent are hereby corrected as shown below:

Column 2, line 48, for "  " read --  --. Column 4, line 3, for " 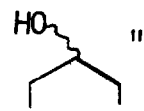 " read -- 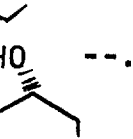 --. Column 4, line 9, for "  " read --  --. Column 6, line 53, for "same different" read -- same or different --.

SIGNED AND SEALED
OCT 13 1970

(SEAL)
Attest:

Edward M. Fletcher, Jr.
Attesting Officer

WILLIAM E. SCHUYLER, JR.
Commissioner of Patents